United States Patent [19]

Kehoe

[11] Patent Number: 4,786,243
[45] Date of Patent: Nov. 22, 1988

[54] APPARATUS FOR FORMING AN EDIBLE PRODUCT

[75] Inventor: Gary S. Kehoe, Ridgefield, Conn.

[73] Assignee: Nabisco Brands, Inc., Parsippany, N.J.

[21] Appl. No.: 864,642

[22] Filed: May 15, 1986

[51] Int. Cl.⁴ .............................................. B29C 47/06
[52] U.S. Cl. ..................... 425/131.1; 99/450.1; 264/171; 264/245; 425/462; 426/516; 426/517
[58] Field of Search ................. 425/131.1, 133.1, 462, 425/DIG. 217; 264/171, 75, 245, 73, 74, 177.13, DIG. 26; 99/450.1, 450.6; 426/512, 516, 517

[56] References Cited

U.S. PATENT DOCUMENTS

| | | | |
|---|---|---|---|
| 1,083,275 | 1/1914 | Eberhard | 264/171 |
| 1,107,184 | 8/1914 | Priban | 264/171 |
| 2,138,378 | 11/1938 | Johnson | 264/171 |
| 2,479,261 | 8/1949 | Reetz | 264/75 |
| 3,180,912 | 4/1965 | Rowe, Jr. | 425/DIG. 217 |
| 3,241,503 | 3/1966 | Schafer | 425/462 |
| 3,477,393 | 11/1969 | Bell et al. | 425/131.1 |
| 3,725,192 | 4/1973 | Ando et al. | 264/171 |
| 3,876,743 | 4/1975 | Soderlund et al. | 264/75 |
| 4,098,435 | 7/1978 | Weyn | 222/94 |
| 4,251,201 | 2/1981 | Krysiak | 425/132 |
| 4,352,825 | 10/1982 | Cherukuri et al. | 426/5 |
| 4,370,114 | 1/1983 | Okamoto et al. | 264/171 |
| 4,399,154 | 8/1983 | Puglia et al. | 426/5 |
| 4,445,835 | 5/1984 | Wasserbach | 425/131.1 |
| 4,459,094 | 7/1984 | Sanabria | 264/75 |
| 4,469,475 | 9/1984 | Krysiak | 425/133.1 |
| 4,496,592 | 1/1985 | Kuwahara et al. | 426/5 |
| 4,504,511 | 3/1985 | Binley | 426/565 |
| 4,518,578 | 5/1985 | Hayes et al. | 424/7.1 |
| 4,528,180 | 7/1985 | Schaeffer | 424/52 |
| 4,542,686 | 9/1985 | Bansal | 99/483 |

FOREIGN PATENT DOCUMENTS

| | | | |
|---|---|---|---|
| 0150934 | 8/1985 | European Pat. Off. | |
| 125717 | 9/1979 | Japan | 264/171 |
| 32733 | 2/1986 | Japan | 425/131.1 |

OTHER PUBLICATIONS

Page 4 of a catalogue from Bepex Hut, West Germany.

Primary Examiner—Jay H. Woo
Assistant Examiner—C. Scott Bushey
Attorney, Agent, or Firm—Richard Kornutik

[57] ABSTRACT

Methods and apparatus for forming an edible product. The apparatus includes an inside tube, an outside tube extending along and around the inside tube, and a plurality of deflector plates extending across the passageway between the tubes. A first edible material is conducted through the inside tube, and a second edible material is conducted through the passageway between the inside and outside tubes. The deflector plates guide that second material into longitudinally extending spaced apart strands, and also form longitudinally extending spaced apart zones substantially free of the second edible material. The first edible material expands into those zones to form a product having alternating outside strands of the edible materials.

21 Claims, 2 Drawing Sheets

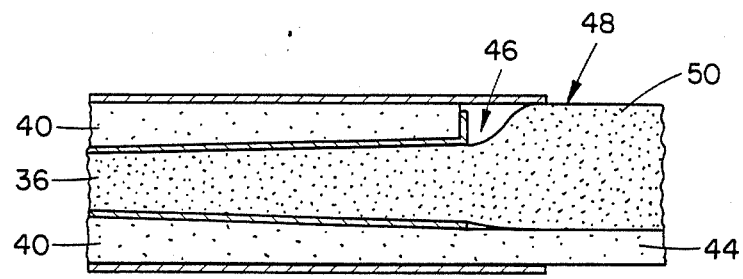
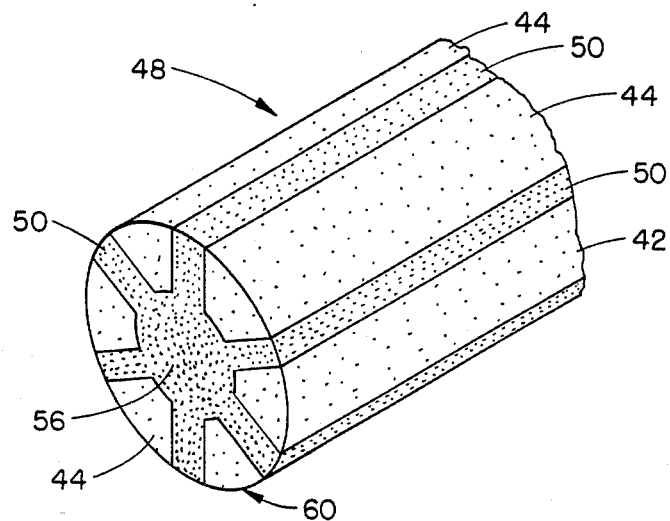
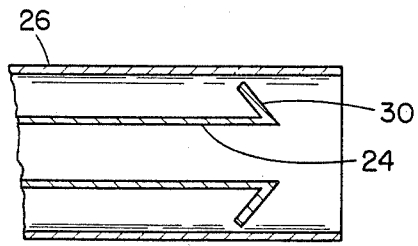

APPARATUS FOR FORMING AN EDIBLE PRODUCT

BACKGROUND OF THE INVENTION

This invention generally relates to apparatus and methods for extruding an edible product having alternating, longitudinally extending outside stripes of first and second materials; and more particularly, to apparatus and methods that may be effectively employed to extrude a chewing gum product having alternating, longitudinally extending outside stripes of different chewing gum materials.

One popular type of chewing gum has an elongated, solid cylindrical shape comprising an inner longitudinal core of a first chewing gum material, and an outer shell of a second chewing gum material. These first and second materials have different flavors and colors, and certain combinations of chewing gum materials are very popular with consumers because of their appearance and flavor characteristics. This product is made by a co-extrusion apparatus comprising a pair of inner and outer, concentric extrusion tubes. In operation, the first gum material is forced through the inner tube, while the second chewing gum material is forced through the annulus between the two tubes, producing the composite chewing gum product, with the outer shell circumferentially completely encasing the inner core.

The entire outside longitudinally extending surface of this product normally has just one color, with the other color normally being visible only at the longitudinal ends of the product. It would be desirable to provide a variation of this product in which both colors appear on the outside longitudinally extending surface, for example in the form of helically twisted stripes. When forming such a product, it is preferred that the different materials remain as distinct longitudinally running stripes in the composite product and do not smear into one another. Also, it is desirable that the methods and apparatus used to make such a product be simple and employ existing equipment to the extent practical.

Several methods and apparatuses are known for producing edible products formed of a plurality of elongated strands of materials helically wrapped around each other. Many of these methods and apparatuses are somewhat complicated, though, requiring, for example, elaborate feed mechanisms, or rotating extruder dies to impart the needed twist to the strands forming the products. Moreover, these prior art methods and apparatuses are normally, if not exclusively, designed for use with materials softer than conventional chewing gum materials; and these methods and apparatuses are not readily adaptable, if at all, for use with the relatively harder chewing gum materials.

SUMMARY OF THE INVENTION

An object of this invention is to provide a very simple co-extrusion method and apparatus to produce an edible product having longitudinally running, alternating, outside stripes of different materials.

Another object of the present invention is to produce a rope-shaped chewing gum product having longitudinally running, alternating, outside stripes of two different chewing gum materials.

A further object of this invention is to direct a first edible material into a plurality of circumferentially spaced apart, longitudinally extending strands, and t expand a second edible material, from an area radially inside those strands, outwardly into the spaces circumferentially between those strands, to form an elongated rope-like product having longitudinally running, alternating outside stripes of those first and second edible materials.

These and other objects are attained with an apparatus for extruding an edible product, and comprising an inside extruder tube, an outside extruder tube extending along and around the inside tube, and a plurality of deflector plates connected to at least a selected one of the inside and outside tubes and extending radially at least partially across the annular passageway therebetween. In use, a first edible material is conducted through the inside tube, and a second edible material is conducted through the annular passageway between the inside and outside tubes. As the second edible material passes through the annular passageway, the deflector plates form from that second edible material into a plurality of circumferentially spaced apart strands extending forward from the annular passageway.

In this manner, those deflector plates also form a plurality of circumferentially spaced apart zones, between those strands, substantially free of the second edible material and also extending forward from the annular passageway. At the same time, the pressure of the first edible material discharged from the inside tube is sufficient so that this material expands radially outwardly into those zones to form a rope-like product having longitudinally running, alternating outside stripes of the first and second edible materials.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 4 is a cross-sectional view of the extruder nozzle, taken along line IV—IV of FIG. 3 and showing first and second edible materials being extruded through the nozzle.

FIG. 5 is a perspective view, partially in cross section, of a portion of a product extruded through the nozzle of FIGS. 2–4.

FIG. 6 is a longitudinal sectional view of an alternate extruder nozzle that may be employed in the apparatus of FIG. 1.

DETAILED DESCRIPTION OF THE PREFERRED EMBODIMENTS

Figure 1:
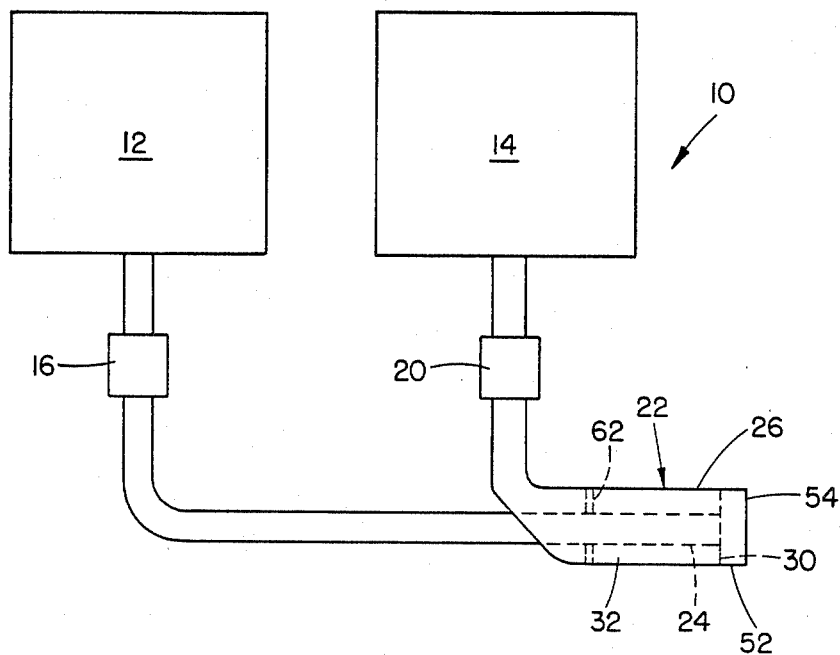
FIG. 1 is a schematic side elevational view of apparatus according to the present invention.

Referring first to the schematic illustration of FIG. 1, extrusion apparatus 10 comprises containers 12 and 14, feed mechanisms 16 and 20, and extruder nozzle 22. Nozzle 22, in turn, includes inside and outside tubes 24 and 26 and a plurality of deflector plates 30. Containers 12 and 14, which may take any suitable form, are provided to hold a supply of first and second edible, extrudable materials; and feed mechanisms 16 and 20 are connected to those containers, respectively, for supplying the first edible material to inside tube 24, and the second edible material to outside tube 26.

Feed mechanisms 16 and 20 may be of the same or different types and optionally selected from among a variety of devices available in the art. As one example, one or both of the mechanisms 16 and 20 may consist of an enclosed, automatically driven rotary valve or auger. As another example, one or both of the feed mechanisms used in apparatus 10 may consist of means for supplying variable pressures to the materials in containers 12 and 14, combined with automatically actuated valve means for regulating the flow of those materials under pressure to tubes 24 and 26.

Figure 2:
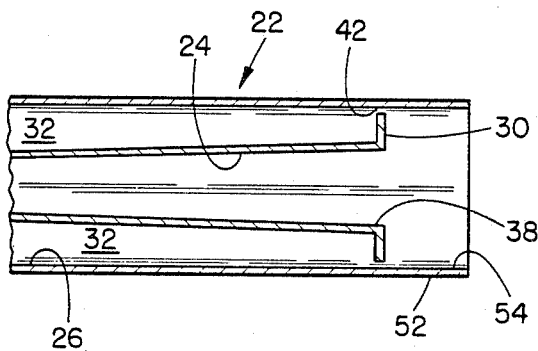
FIG. 2 is a longitudinal cross-sectional view showing the extruder nozzle of the apparatus of FIG. 1.
Figure 3:
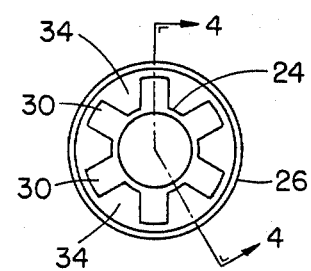
FIG. 3 is a front view of the extruder nozzle of FIG. 2.

FIGS. 2-4 show extruder tubes 24 and 26 and deflector plates 30 in greater detail. Outside tube 26 longitudinally extends along and circumferentially extends completely around inside tube 24; and, in this way, tubes 24 and 26 form annular passageway 32 therebetween. Deflector plates 30 are connected to at least a selected one of the inside and outside tubes 24 and 26, extend at least partially across annular passageway 32, and form a plurality of circumferentially spaced apart openings 34 in passageway 32.

During operation of extruder apparatus 10, the first edible material (identified by reference number 36 in FIG. 4) is conducted through inside tube 24 and through front outlet 38 thereof, and the second edible material (identified by reference number 40 in FIG. 4) is conducted through annular passageway 32 and through outlet 42 thereof. Deflector plates 30 partially block forward movement of second edible material 40 through annular passageway 32 and guide that edible material into openings 34 so that the second edible material is discharged from the annular passageway through those openings.

In this way, deflector plates 30 form second edible material 40 into a plurality of circumferentially spaced apart strands 44 (one of which is shown in FIG. 4) extending forward from annular passageway 32, and more specifically, longitudinally extending directly forward from spaces 34. Deflector plates 30 also form a plurality of circumferentially spaced apart zones 46 (one of which is shown in FIG. 4), between strands 44 and substantially free of second edible material 40. Zones 46 also extend forward from annular passageway 32, and more specifically, longitudinally extend directly forward from plates 30. At the same time, the pressure of first edible material 36 discharged from inside tube 24 is sufficient so that this material expands radially outwardly into zones 46 to fill those zones with the first edible material and to thereby form product 48 having longitudinally running, alternating strands, or spokes, 44 and 50 of the second and first edible materials respectively, as seen in FIG. 5. These strands 44 and 50, in turn, form alternating outside stripes on product 48 of the first and second edible materials.

Outside tube 26 includes forward portion 52 projecting forward of outlet 38 of inside tube 24 and forming an expansion section wherein first edible material 36 expands outwardly into zones 46. Portion 52 of tube 26 limits radially outward movement of edible material 36 discharged from inside tube 24, also limits radially outward movement of edible material 40 discharged from annular passageway 32, and, in addition, guides forward movement of the formed product 48. Tube portion 52 includes front outlet 54 to discharge product 48 from extruder nozzle 22, and a conventional conveyer belt or other suitable carrier (not shown) may be located below the nozzle outlet 54 to carry the extruded product away from that outlet. Preferably, forward portion 52 projects forward of inside tube 24 a distance greater than the maximum radial distance between the inside and outside tubes at the front terminal edge of the inside tube.

As clearly shown in FIG. 5, the formed product 48 comprises inner cylindrical core 56 of the first edible material, and outer shell portion 60 comprised of the alternating spokes 44 and 50 of the first and second edible materials. If desired, the formed product 48 may be twisted about its longitudinal axis in any acceptable way to twist strands 44 and 50 into a helical pattern.

Preferably, deflector plates 30 are connected to at least inside tube 24; and even more preferably, the deflector plates are connected to both inside and outside tubes 24 and 26 so that the deflector plates support the inside tube within the outside tube. Also, preferably deflector plates 30 radially extend completely, or at least substantially completely, across annular passageway 32 to substantially prevent the second edible material from passing forward radially between the deflector plates and inside and outside tubes 24 and 26. In addition, plates 30 are preferably located adjacent the front terminal edge of inside tube 24; and, more specifically, those plates extend outward from that edge of the inside tube.

For example, deflector plates 30 may be integral with the front terminal edge of the inside tube 24; and these deflector plates may be formed by simply cutting or stamping out circumferentially spaced apart portions of a forward section of tube 24, and then bending outward the remaining portions of that forward section of the tube to form the deflector plates. Once tube 24 and deflector plates 30 are made, they may be inserted into outside tube 26, and then plates 30 may be brazed or welded to that outside tube to securely connect them thereto.

Alternatively, each deflector plate may include a first part connected to and extending radially inwardly from outside tube 26, and a second part connected to and extending radially outwardly from inside tube 24. The second part of the plate extends radially directly inwardly of the first part of the deflector plate, and these parts of the deflector plate may or may not themselves be connected together. As shown in FIG. 2, deflector plates 30 extend generally perpendicular to the longitudinal axis of the inside tube 24; however, this is not necessary to the practice of the present invention and, for example, the deflector plates may, as shown in FIG. 6, extend outwardly rearwardly relative to the inside tube.

Support means, such as a pair of radially extending arms 62 (shown in FIG. 1), may be connected to inside and outside tubes 24 and 26 to help hold the inside tube in a preferred position within the outside tube. Preferably, the rearwardly facing surfaces of arms 62 are rounded or curved to reduce any turbulence or gap that is created by those arms in the edible material flowing forward therepast. In addition, preferably arms 62 are located a substantial distance rearward of deflector plates 30 so that any turbulence or gap created in the flow of the material past those arms is dissipated by the time that material reaches the deflector plates.

Tubes 24 and 26 may have cross-sectional shapes different than what is shown in the drawings; and, for instance, they may have square, rectangular or eliptically shaped cross-sections. Furthermore, outside tube 26 may have a cross-section that is different than the cross-section of inside tube 24; and, for example, the outside tube may have a square cross-section while the inside tube has a circular cross-section. Further, preferably tubes 24 and 26 are concentrically positioned with respect to each other, and the inside tube tapers forwardly radially outwardly relative to the outside tube, although these features are not essential to the practice of this invention in its broadest sense.

The specific pressures and volumes of the materials extruded through nozzle 22 may be varied over extensive ranges. Preferably, though, the material conducted through inside tube 24 is at or near the pressure of the material conducted through annular passageway 32 in order to minimize any pressure differential across the wall of the inside tube. Also, with the embodiment of nozzle 22 shown in the drawings, the cross-sectional area of annular passageway 32 adjacent the outlet 42 thereof is approximately equal to the cross-sectional area of inside tube 24 at outlet 38 thereof.

The number and sizes of the alternating strands 44 and 50 in product 48 may be varied over considerable ranges. The number of such strands can be varied by changing the number of deflector plates 30, and the sizes of strands 44 and 50 can be changed by varying the circumferentially extending lengths of individual plates 30. In particular, changing the circumferentially extending length of plates 30 changes the thickness of strands 50 in the circumferential direction, while changing the spacing between the deflector plates in the circumferential direction, changes the thickness of strands 44 in the circumferential direction.

Further, as will be understood by those of ordinary skill in the art, the circumferentially extending thickness of strands 44 may be different than the circumferentially extending thickness of strands 50. Also, the thickness of strands 44 and 50 in the radial direction depends on the radial distance between inside and outside tubes 24 and 26 at outlet 42 of annular passageway 32, and the thickness of inner core 56 in the radial direction is determined by the inside diameter of the inside tube at outlet 38. In addition, strands 44 can be regularly or irregularly spaced apart, and they can radiate outward from core 56 either along straight or along curved lines.

Extruder nozzle 22 is very simple to construct, install and operate; and, in particular, the extruder nozzle of this invention may be made by adding deflector plates 30 to various types of commercially available coextrusion devices. Moreover, the number of strands 44 and 50 on the formed product 48 may be changed by simply changing the number of deflector plates 30, and it is not necessary to change or vary the number of mechanisms or lines feeding material to extruder nozzle 22, or to provide complicated equipment inside the extruder nozzle to split the material fed thereto into a plurality of ropes or strands.

Apparatus 10 works very well with conventional chewing gum materials; and, for example, several suitable chewing gum formulations that may be used in the practice of this invention are described in detail in U.S. Pat. Nos. 4,352,825 and 4,399,154. In particular, the first edible material may comprise a first chewing gum formulation including a gum base, a premixed recrystallized combination of at least two sweeteners, including solids and liquid sweeteners, which preferably include sucrose and/or sorbitol and/or hydrogenated starch hydrolysate, and high fructose syrup alone or together with liquid glucose, hydrogenated starch, hydrolysate syrup, corn syrup, sorbitol syrup and/or invert sugar, in the recrystallized mixture, and flavors, softeners and other conventional chewing gum ingredients. The second edible material may comprise a second chewing gum formulation including any of the sweeteners, flavors, bulking agents, gum base ingredients and other miscellaneous ingredients that may be present in the first chewing gum formulation.

The coextruded chewing gum product of this invention may take various shapes and sizes, and may be multi-colored and/or multi-flavored. At the same time, it should be noted that the method and apparatus of this invention may be used with edible materials, such as cereals, dough, pastry products, ice confections and medicaments, other than chewing gum materials.

While it is apparent that the invention disclosed herein is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. Apparatus for extruding an edible product of the type having an elongated, internal cylindrical core and an elongated annular sheath annularly extending completely around the cylindrical core and defining a longitudinally and annularly extending outside surface, the apparatus comprising:

first supply means for holding a first extrudable edible material;

second supply means for holding a second extrudable edible material;

an inside extruder tube;

an outside extruder tube extending along and around the inside tube, the inside and outside tubes forming an annular passageway continuously extending around the inside tube, between the inside and outside tubes, the outside tube including a forward portion projecting forward of the inside tube to engage and shape the outside surface of the edible product and to guide forward movement thereof;

means connected to the second supply means and to the outside extruder tube to feed the second edible material from the second supply means, to and through the annular passageway, the second material moving through said annular passageway in the shape of an elongated ring;

a plurality of deflector plates connected to at least a selected one of the inside and outside tubes and radially extending at least partially across the annular passageway at a front end thereof, to force the second edible material from said elongated ring and into a plurality of circumferentially spaced apart strands longitudinally extending forward from the annular passageway and radially extending outward from the core of the edible product to the outside surface thereof, and to form a plurality of circumferentially spaced apart zones, between said strands, substantially free of the second edible material and extending forward from the annular passageway; and means connected to the first supply means and to the inside extruder tube to feed the first edible material from the first supply means, to and through the inside extruder tube, and radially outwardly into said zones to form the first edible material into the core of the product and into a plurality of strands radially extending outward from the core of the edible product to the outside surface thereof, whereby the annular sheath of the edible product includes alternating longitudinally extending strands of the first and second edible materials.

2. Apparatus according to claim 1, wherein:
the forward portion of the outside tube defines a tube axis;
the deflector plates form a plurality of circumferentially spaced apart openings in the annular passageway;
said strands of the second edible material extend directly forward from said openings, parallel to said tube axis; and
said zones extend directly forward from the deflector plates, parallel to said tube axis.

3. Apparatus according to claim 2, wherein the deflector plates are connected to both the inside and the outside tubes to support the inside tube within the outside tube.

4. Apparatus according to claim 2, wherein: the inside tube includes a front terminal edge; and the deflector plates extend across the annular passageway adjacent the front edge of the inside tube.

5. Apparatus according to claim 4, wherein the deflector plates are integrally connected to and extend outward from the front edge of the inside tube.

6. Apparatus according to claim 4, wherein the deflector plates extend outward from the inside tube generally perpendicular to the longitudinal axis thereof.

7. Apparatus according to claim 4, wherein the deflector plates extend outwardly rearwardly from the inside tube.

8. Apparatus according to claim 2, further including support means connecting the inside tube to the outside tube to hold the inside tube in place within the outside tube.

9. Apparatus according to claim 8, wherein the support means includes a pair of arms connected to and radially extending between the inside and outside tubes.

10. Apparatus according to claim 9, wherein the inside tube is concentric with the outside tube.

11. Apparatus according to claim 2, wherein:
the inside tube includes a front terminal edge; and
the outside tube projects forward of the inside tube a distance greater than the maximum radial distance between the inside and outside tubes at the front terminal edge of the inside tube.

12. Apparatus according to claim 5, wherein the deflector plates are formed by bending radially outwardly a forward portion of the inside tube.

13. Apparatus according to claim 1, wherein
the inside extruder tube has a front edge; and
the spaced apart zones extend into the forward portion of the outside tube, radially outside of the forward projection of the front edge of the inside tube.

14. Apparatus according to claim 1, wherein:
each deflector plate is located directly forward of a respective portion of said elongated ring, and forces the second edible material from said respective portion and into the strands of the second edible material.

15. Apparatus according to claim 1, wherein the inside tube forwardly tapers radially outwardly.

16. An extruder nozzle for extruding first and second extrudable edible materials into an edible product of the type having an elongated, internal cylindrical core and an elongated annular sheath annularly extending completely around the cylindrical core and defining a longitudinally and annularly extending outside surface, the extruder nozzle comprising:
an inside tube for receiving the first edible material and forming the first edible material into the core of the edible product;
an outside tube extending along and around the inside tube, the inside and outside tubes forming an annular passageway continuously extending around the inside tube, between the inside and outside tubes, for receiving the second edible material and guiding the second edible material forward through the annular passageway in the shape of an elongated ring; and
a plurality of deflector plates secured in the annular passageway adjacent a front end thereof to force the second edible material from said elongated ring and into a plurality of circumferentially spaced apart strands longitudinally extending forward from the annular passageway and radially extending outward from the core of the edible product to the outside surface thereof, and to form a plurality of circumferentially spaced apart zones, between said strands, substantially free of the second edible material, said zones longitudinally extending forward from the annular passageway and radially extending from the core of the edible product to the outside surface thereof; and
the outside tube including a forward portion projecting forward of the inside tube, and forming an expansion section wherein the first edible material expands radially outwardly from the inside tube to fill said zones and form a plurality of strands radially extending outward from the core of the edible product to the outside surface thereof, whereby the annular sheath of the edible product includes alternating longitudinally extending, outside strands of the first and second edible materials.

17. An extruder nozzle according to claim 16, wherein:
the inside tube includes a front terminal edge; and
the deflector plates are integrally connected to and extend outward from the front edge of the inside tube.

18. An extruder nozzle according to claim 17, wherein the deflector plates are also connected to the outside tube to support the inside tube therewith.

19. An extruder nozzle according to claim 18, wherein the inside tube is concentric with the outside tube.

20. An extruder nozzle according to claim 16, wherein the deflector plates are formed by bending radially outwardly a forward portion of the inside tube.

21. An extruder nozzle according to claim 20, wherein the inside tube forwardly tapers radially outwardly.

* * * * *